es Patent Office 2,824,008
Patented Feb. 18, 1958

2,824,008

SALT SUBSTITUTE

Giulio C. Perri, Douglaston, and Kurt Ladenberg, Chappaqua, N. Y.

No Drawing. Application March 12, 1956
Serial No. 570,675

4 Claims. (Cl. 99—143)

This invention relates to an edible composition, and more particularly to an edible composition which may be employed as a substitute for common table salt.

Table salt, which is relatively pure sodium chloride, is a common ingredient of the human diet, contributing both physiologically and to the palatability of the foods eaten by human beings. Most foods prepared without salt are tasteless, flat and unpalatable in addition to being more difficult to digest because of the very unpalatability thereof. It has long been recognized, however, that many diseases, when contracted by humans, require the minimization or elimination in the diet of the use of sodium. Further, the tendency of the sodium content in the diet to cause an accumulation of fluids with a corresponding increase in weight, by the body tissues has further emphasized the importance of reducing the sodium intake in reducing diets. Many substances and mixtures have been suggested for use as a substitute for sodium chloride in sodium restricted diets, in order to impart the flavor of table salt to foods. As examples of such substitutes, there may be mentioned ammonium chloride, potassium chloride, and mixtures thereof and/or with other substances.

Ammonium ion is not a particularly desirable component of any human diet, and particularly the diet of one suffering from a disease. Thus, ammonium salts are known to act as expectorants by increasing the amount of fluid secreted by the lung epithelium, promoting coughing and the like. They must be eliminated by the body as urea thus putting a strain on the liver and the kidneys. They decompose readily at elevated temperatures such as employed in cooking and baking, thereby changing the pH value, taste and other properties of the foods containing them. When ammonium chloride is taken orally, it acidifies the urine which is not desirable. In addition, ammonium chloride does not exactly duplicate the taste of sodium chloride, having what might be called a "bitter taste."

Potassium chloride has been often proposed as a substitute for sodium chloride, but this salt also does not by itself have the taste of sodium chloride, since it is usually accompanied by a somewhat bitter aftertaste. The primary function of a salt substitute is to supply an ingredient having the taste of sodium chloride. To be acceptable, it should also resemble table salt in other respects such as appearance, physical properties, stability, non toxicity, and the like.

It is an object of this invention to provide a dietary substitute for common table salt. It is another object of this invetnion to provide an edible, sodium-free, saline tasting composition. Other objects and advantages will appear as the description proceeds.

The attainment of the above objects is made possible by the instant invention, which is based upon the provision of a composition comprising, by weight, about 45 to 55 parts of potassium chloride, about 30 to 40 parts of dipotassium succinate, and about 10 to 20 parts of dipotassium fumarate. In its preferred embodiment, the composition of this invention contains about 50 parts of potassium chloride, 35 parts of dipotassium succinate, 15 parts of dipotassium fumarate, and 0.05 to 0.5 part, preferably 0.1 part, of sugar. The above described compositions have been found to be highly improved with respect to the semblance to the taste of common table salt, in addition to being physiologically acceptable. The only cation employed in the salts of the compositions of the instant invention is potassium. The fumarate, succinate, and when employed, the sugar, apparently act to mask the bitter aftertaste usually accompanying the use of potassium chloride. In addition, the fumarate and succinate anions are readily utilized and metabolized by the physiological process of the living cell. The end products of such physiological process are water and carbon dioxide which contributes to the buffering capacity of the blood through bicarbonate ion formation. In addition to the above described desirable properties with respect to taste and physiological acceptance, the compositions of the instant invention resemble common table salt with respect to the free flowing crystalline or granular character thereof, solubility, and the like.

In the preferred form of the invention, the instant compositions are provided in a solid form, as for example in the form of a powdery, crystalline, or granular composition resembling dry table salt. In producing such compositions, the dry ingredients may be mixed and/or ground together in known manner in the proper proportions and graded to the desired particle size. Other known methods may of course be employed, as for example evaporation and/or crystallization from a solution of one or more of the components, spraying of a solution of one or more of the components upon one or more of another of the components of the instant compositions, followed by drying, trituration of the mixed dry components in a pony mixer or granulator in the presence of a small amount of water followed by screening and drying, etc. If desired, the compositions of the instant invention may be made available in the form of tablets or lumps by compression in the usual manner, if desired with the aid of the usual binders. In some instances it may be desirable to provide the compositions of the instant invention in the form of a relatively concentrated aqueous solution, for example of from about 10 to 25%, and preferably about 20% by weight, which under normal conditions is mold resistant and bacteriostatic. Other additives commonly employed in salt substitute compositions may be added to the compositions of the instant invention without departing from the scope thereof. Such additives, as for example diluents, binders, anti-caking agents, anti-dusting agents, preserving agents, and the like, should of course not be added to the instant compositions in amounts which would effect the desired properties thereof. Such substances include for example, starches and gums of various sorts, carboxymethylcellulose, magnesium, stearate, calcium stearate, tricalcium phosphate, salicylic acid, potassium benzoate, aseptoform, iodine in stabilized form, and the like.

The following example, in which parts are by weight, unless otherwise indicated, is illustrative of the instant invention and is not to be regarded as limitative.

*Example*

100 grams of pure potassium chloride is ground and screened through a 42 mesh screen.

Approximately 30 grams of fumaric acid is dissolved in water at 70° C. and neutralized with potassium hydroxide to pH 6.5. The liquid is evaporated under vacuum at 50° C. to incipient crystallization. It is cooled and the crystals filtered, dried and ground. They are screened through a 42 mesh screen and 30 grams of the dipotassium fumarate is added to the potassium chloride.

Succinic anhydride is dissolved in water at 70° C. and neutralized to pH 6.8 with potassium hydroxide. The liquid is evaporated under vacuum to incipient crystallization, the mixture is cooled and the crystals are filtered, dried and ground. 70 grams of dipotassium succinate screened through 42 mesh is mixed with the above potassium chloride and dipotassium fumarate mixture, and to the mixture is added 0.2 gram of sugar.

The resulting product is a white, free-flowing salt mixture with agreeable taste. The product is not hygroscopic, is salt-like in taste and readily soluble in water.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

What we claim is:

1. An edible composition comprising, by weight, about 45 to 55 parts of potassium chloride, 30 to 40 parts of dipotassium succinate, and 10 to 20 parts of dipotassium fumarate.

2. An edible composition comprising, by weight, 45 to 55 parts of potassium chloride, 30 to 40 parts of dipotassium succinate, 10 to 20 parts of dipotassium fumarate, and 0.05 to 0.5 part of sugar.

3. An edible composition comprising, by weight, about 50 parts of potassium chloride, 35 parts of dipotassium succinate and 15 parts of dipotassium fumarate.

4. An edible composition comprising, by weight, about 50 parts of potassium chloride, 35 parts of dipotassium succinate, 15 parts of dipotassium fumarate, and 0.1 part of sugar.

References Cited in the file of this patent

UNITED STATES PATENTS

| | | |
|---|---|---|
| 1,772,183 | Krantz | Aug. 5, 1930 |
| 2,471,144 | Davy | May 24, 1949 |

FOREIGN PATENTS

| | | |
|---|---|---|
| 421,554 | Great Britain | Dec. 24, 1934 |

OTHER REFERENCES

"The Chemical Senses" by Moncrieff, Leonard Hill Limited, 17 Stratford Place, W. I. London, 1944, pp. 236, 237 and 275.

UNITED STATES PATENT OFFICE
CERTIFICATE OF CORRECTION

Patent No. 2,824,008                                          February 18, 1958

Giulio C. Perri et al.

It is hereby certified that error appears in the above numbered patent requiring correction and that the said Letters Patent should read as corrected below.

In the grant, lines 1-2 and line 11, and in the heading to the printed specification, line 3, name of the co-inventor, for "Kurt Ladenberg", each occurrence, read -- Kurt Ladenburg --.

Signed and sealed this 3rd day of June 1958.

(SEAL)
Attest:

KARL H. AXLINE
Attesting Officer

ROBERT C. WATSON
Commissioner of Patents